UNITED STATES PATENT OFFICE.

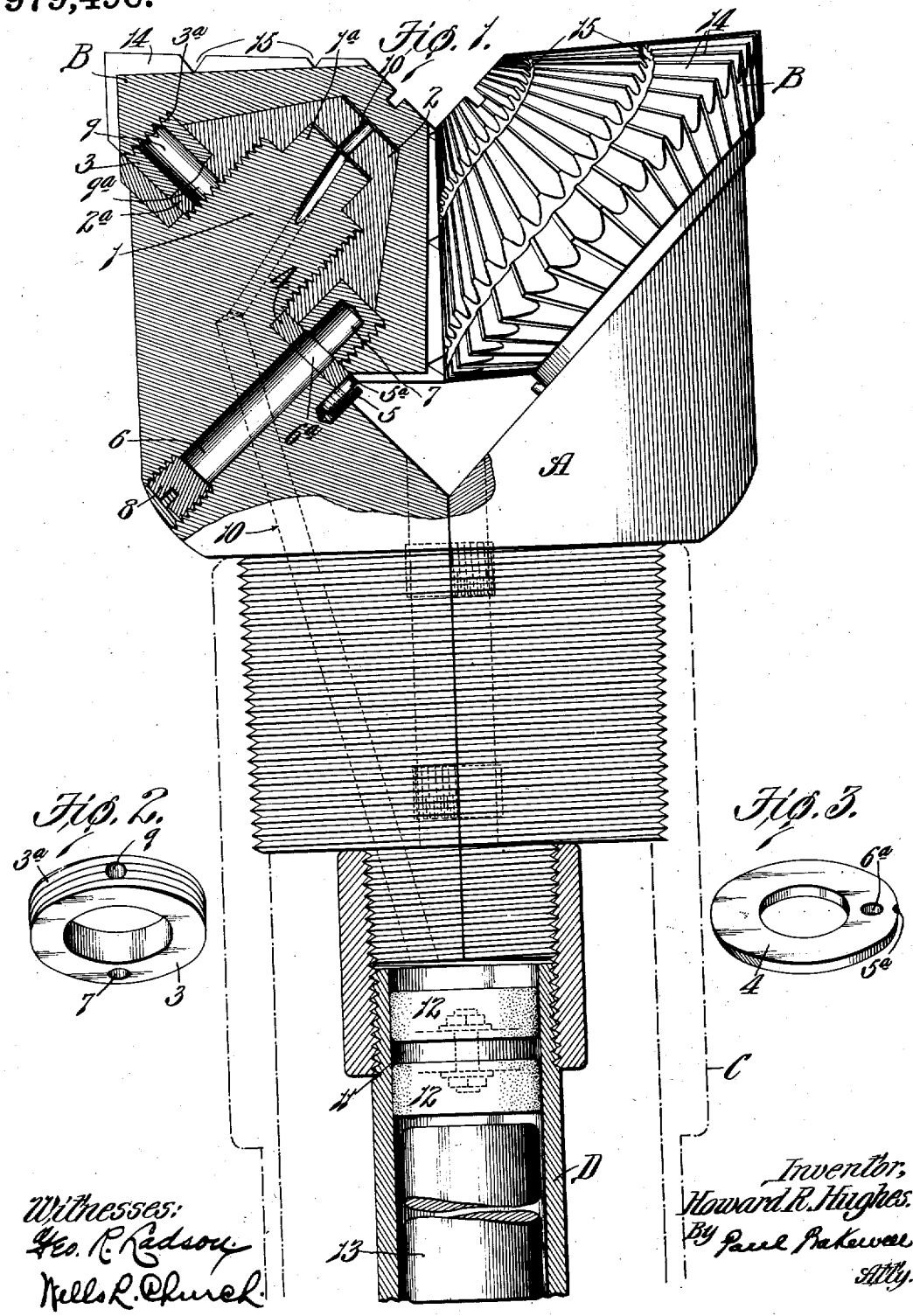

HOWARD ROBERT HUGHES, OF HOUSTON, TEXAS.

ROLLER BORING-DRILL.

979,496.   Specification of Letters Patent.   Patented Dec. 27, 1910.

Application filed May 26, 1910. Serial No. 563,640.

*To all whom it may concern:*

Be it known that I, HOWARD ROBERT HUGHES, a citizen of the United States, residing at Houston, Texas, have invented a certain new and useful Improvement in Roller Boring-Drills, of which the following is a full, clear, and exact description, such as will enable others skilled in the art to which it appertains to make and use the same.

This invention relates to roller boring drills, and particularly to drills of that type which are provided with approximately frusto-conical-shaped cutting rollers that cover the ends of the spindles on which they are mounted.

One object of my present invention is to provide a drill of the type referred to having approximately conical-shaped spindles that provide a large bearing surface for the rollers mounted on same.

Another object is to provide a roller drill having means of novel construction for retaining the rollers on their spindles. And still another object is to provide a strong and serviceable roller drill which is so designed that the rollers and portions of their spindles can be removed and replaced easily when it is necessary to renew said parts on account of wear.

Other objects and desirable features of my invention will be hereinafter pointed out.

Figure 1 of the drawings is a side elevational view partly in vertical section of a roller drill constructed in accordance with my invention; Fig. 2 is a perspective view of one of the rings that is used for retaining the rollers on their spindles, and Fig. 3 is a perspective view of one of the washers that is interposed between the rollers and the head of the drill.

Referring to the drawings which illustrate the preferred form of my invention, A designates the head of the drill which is preferably composed of a plurality of sections, and B designates the cutting rollers that are mounted on said head. The drill herein shown is provided with a pair of approximately frusto-conical-shaped cutting rollers which are arranged in a V-shaped pocket formed in the end face of the head but I do not wish it to be understood that my invention is limited to the exact construction herein shown as the particular number of rollers and the arrangement of said rollers on the head is immaterial so far as certain features of my present invention are concerned.

Each of the rollers B is rotatably mounted on a spindle which is composed of a permanent portion 1 and a removable portion 2 whose outer surface is approximately frusto-conical-shape so as to provide a large bearing surface for the roller which is mounted thereon. The permanent portion 1 of the spindle is preferably integrally connected to the head of the drill, and is provided with external screw-threads that coöperate with internal screw-threads on the removable portion 2 so as to securely hold said removable portion in position, and, if desired, the permanent portion 1 can be provided at its outer end with a reduced extension $1^a$ which fits in a socket of corresponding dimensions in the removable portion 2. The removable portion 2 of the spindle is reduced at its inner end so as to form an approximately cylindrical-shaped shank $2^a$ which is surrounded by a ring 3 that is connected to the roller B, the enlarged part of said removable portion 2 projecting over said ring, as shown in Fig. 1, so as to prevent the roller from moving longitudinally of the spindle. The ring 3 can be connected to the roller B in various ways but I prefer to provide said ring with external screw-threads $3^a$ that coöperate with screw-threads on the wall of a socket formed in the base end of the roller so as to enable the roller to be screwed onto said ring, as hereinafter described. If desired, a washer 4 can be arranged between the head of the drill and the base end of the roller so as to prevent the head from being worn away, and in the embodiment of my invention herein shown the washer 4 is so designed that the shank $2^a$ of the removable portion of the spindle bears against same so as to prevent said washer from moving longitudinally of the spindle, the head A being provided with a removable stop 5 that fits in a notch $5^a$ in the periphery of the washer so as to prevent said washer from rotating.

In the operation of assembling the parts of the drill, the washer 4 is first slipped over the permanent part 1 of the spindle and the ring 3 is then slipped over said part 1. The removable part 2 of the spindle is thereafter screwed onto the permanent part 1 so as to lock the ring 3 in position but still permit it to rotate on the reduced shank 2ª of said removable part. The final step of the assembling operation consists in screwing the roller B onto the ring 3, and in order that said ring may be held stationary while the roller is being screwed onto same I have provided the head of the drill and the washer 4 with openings 6 and 6ª, respectively, that permit a tool, not shown, to be introduced into a recess or hole 7 in the ring 3. A screw-threaded plug 8 is preferably arranged in the outer end of the opening 6 in the head so as to prevent said opening and the opening 6ª in the washer and recess 7 in the ring from becoming clogged with dirt.

When it is desired to remove the roller the operator forces a pin or tool through the openings 6 and 6ª into the recess 7 so as to hold the ring stationary while the roller is being unscrewed from same, and if the removable part 2 of the spindle has worn away to such an extent that the roller wabbles or does not fit same snugly said removable part 2 can be taken off the permanent part of the spindle and a new part 2 substituted for same. In order that the operator may remove the removable part 2 of the spindle easily I have provided the ring 3 and the reduced shank 2ª of the removable part of the spindle with openings 9 and 9ª, respectively, so as to enable a pin or tool to be forced into said openings and thus act as a handle or lever to turn or unscrew said removable part 2.

A spindle of the form above described is exceptionally strong and will successfully withstand the strains to which it is subjected when the drill is in service, and as the frusto-conical-shaped outer surface of said spindle provides a large bearing surface for the roller, the coöperating bearing faces on the roller and spindle will not wear away quickly. The way in which the roller is mounted on the spindle reduces the liability of dirt and grit collecting on the coöperating bearing surfaces of the roller and spindle, and as the ring 3 which retains the roller in position is completely surrounded by metal there is no possibility of said retaining ring being broken and thus permitting the roller to drop off the head of the drill. The fact that the roller supporting spindle is exceptionally strong and can be renewed by simply substituting a new end portion of the spindle enables the drill to be used indefinitely and maintained at a low cost. And still another desirable feature of my drill is that the parts thereof can be assembled and disassembled easily.

The pipe C or hollow operating member which imparts rotary movement to the head of the drill clamps the sections of the head A together, and a lubricant-holder D is arranged inside of said hollow operating member for containing a lubricating medium that is fed through ducts 10 to surfaces of the drill which it is desired to lubricate. A plunger 11 is arranged in the holder D for forcing the lubricating medium through said ducts, and said plunger is provided on its opposite side with washers 12 which protect the lubricating medium from the water which is forced down through the pipe C to flush out the disintegrated material in the hole being formed. The pressure of the water which is forced down through the pipe C exerts practically a constant pressure on the plunger 11 and thus causes the lubricating medium to be forced through the ducts 10 continually, and, if desired, a weight 13 can be arranged in the holder D above the plunger 11 so as to exert a tamping action on said plunger when the drill vibrates and when the charges of water are pumped into the pipe C.

The cutting surfaces of the rollers may be of any preferred design but I have found that rollers of the form herein shown are very efficient and do not wear out or break easily, said rollers being provided with longitudinally extending chisel-teeth 14 that are intersected by a spiral groove 15. The pitch of a portion of the teeth of each roller is different from the remaining portion of the teeth, and the spiral groove 15 in one roller is arranged staggered or out of alinement with the spiral groove in the other roller so that the rollers will not track when the drill is in operation.

Having thus described my invention, what I claim as new and desire to secure by Letters Patent is:

1. A roller boring drill, comprising a head provided with an approximately conical-shaped spindle, and an approximately conical-shaped cutting roller mounted on said spindle.

2. A roller boring drill, comprising a head provided with a spindle having an approximately frusto-conical-shaped outer surface, and a roller mounted on said spindle and provided with an approximately frusto-conical-shaped cutting surface.

3. A roller boring drill, comprising a head provided with a tapered spindle, and a cutting roller mounted on said spindle and covering the end of same.

4. A roller boring drill, comprising a head provided with a tapered spindle having a reduced portion, a cutting roller mounted on said spindle and covering the end of same, and a device on said roller that projects into the reduced portion of said spindle so as to prevent the roller from moving longitudinally of the spindle.

5. A roller boring drill, comprising a head provided with a tapered spindle having a reduced portion, an approximately frusto-conical-shaped cutting roller rotatably mounted on said spindle, and a projection on said roller that fits in the reduced portion of said spindle and thus prevents the roller from moving longitudinally thereof.

6. A roller boring drill, comprising a head provided with a tapered spindle, an approximately frusto-conical-shaped cutting roller rotatably mounted on said spindle, and a removable ring in said roller that lies in a reduced portion of said spindle and thus prevents the roller from moving longitudinally of the spindle.

7. A roller boring drill, comprising a head provided with inclined spindles that project inwardly toward the longitudinal axis of the head, the outer surfaces of said spindles being approximately frusto-conical-shaped, and approximately frusto-conical-shaped cutting rollers mounted on said spindles, and covering the ends of same.

8. A roller boring drill, comprising a head provided with inclined spindles that project inwardly toward the longitudinal axis of the head, the outer surfaces of said spindles being approximately frusto-conical-shaped, approximately frusto-conical-shaped cutting rollers mounted on said spindles and covering the ends of same, and projections on said rollers that fit in reduced portions of said spindles and thus prevent the rollers from moving longitudinally of the spindles.

9. A roller boring drill, comprising a head, a spindle on said head provided with a removable bearing surface, and a roller mounted on said spindle.

10. A roller boring drill, comprising a head, a spindle on said head provided with an approximately frusto-conical-shaped removable bearing surface, and a roller mounted on said spindle.

11. A roller boring drill, comprising a head, a spindle on said head provided with a removable tapered bearing surface, and an approximately frusto-conical-shaped roller mounted on said spindle and covering the end thereof.

12. A roller boring drill, comprising a head provided with a permanent spindle portion, a removable roller bearing surface screwed onto said permanent portion, and a roller surrounding said bearing surface.

13. A roller boring drill, comprising a head provided with an integral spindle portion that has external screw-threads, a tapered removable portion mounted on said permanent portion, and a cutting roller mounted on said tapered portion.

14. A roller boring drill, comprising a head provided with an integral spindle portion that has a reduced extension, a removable roller bearing mounted on said spindle portion and provided with a tapered outer surface, and a roller mounted on said bearing.

15. A roller boring drill, comprising a head, a spindle on said head having an enlarged end portion, and a roller mounted on said spindle and provided with means that extends under said enlarged portion and thus retains the roller in position.

16. A roller boring drill, comprising a head provided with a spindle that has an enlarged tapered end portion and a cylindrical-shaped base portion, a roller mounted on said spindle, and a member on said roller that surrounds the cylindrical-shaped portion of the spindle and bears against the enlarged portion of said spindle.

17. A roller boring drill, comprising a head provided with a permanent spindle portion, a removable bearing surface detachably connected to said spindle portion and having a cylindrical-shaped shank and a tapered end portion, a roller mounted on said bearing, and a ring on said roller that projects under the tapered end portion of said bearing.

18. A roller boring drill, comprising a head, a spindle on said head provided with a reduced portion, a roller mounted on said spindle, a ring in said roller that fits in the reduced portion of said spindle, said head having an opening for permitting a tool to be moved into engagement with said ring so as to hold it at rest while the roller is being attached thereto, and a closure for said opening.

19. A roller boring drill, comprising a head, a spindle on said head provided with a reduced portion, an approximately frusto-conical-shaped roller mounted on said spindle and provided at its base end with a screw-threaded socket, a ring mounted in said socket and projecting into the reduced portion of the spindle, and a washer interposed between the base end of the roller and the head of the drill, said head and washer being provided with openings for permitting a tool to be forced into engagement with the ring so as to hold it at rest while the roller is being attached thereto, and a closure for said opening.

20. A roller boring drill, comprising a head provided with a screw-threaded spindle portion, a removable bearing screwed onto said spindle portion and having an enlarged tapered end, a roller mounted on said bearing, and a ring arranged in a screw-threaded socket in the base end of the roller and projecting underneath the enlarged end of said bearing so as to retain the roller in position, said removable bearing and ring being provided with openings for receiving a tool that is used for turning the bearing relatively to the spindle portion on said head.

21. A roller boring drill, comprising a head provided with inclined spindles that project inwardly toward the longitudinal axis of the head, and approximately frusto-conical-shaped rollers mounted on said spindles and provided with longitudinally extending chisel teeth, said rollers having spirally arranged grooves which are so disposed that the rollers will not track when in service.

In testimony whereof I hereunto affix my signature in the presence of two witnesses, this twenty-fourth day of May 1910.

HOWARD ROBERT HUGHES.

Witnesses:
WELLS L. CHURCH,
GEORGE BAKEWELL.

---

Correction in Letters Patent No. 979,496.

It is hereby certified that in Letters Patent No. 979,496, granted December 27, 1910, for an improvement in "Roller Boring-Drills" the name of the patentee was erroneously written and printed "Howard Robert Hughes," whereas said name should have been written and printed *Howard Robard Hughes;* and that the said Letters Patent should be read with this correction therein that the same may conform to the record of the case in the Patent Office.

Signed and sealed this 17th day of January, A. D., 1911.

[SEAL.]

C. C. BILLINGS,

*Acting Commissioner of Patents.* is used for turning the bearing relatively to the spindle portion on said head.

21. A roller boring drill, comprising a head provided with inclined spindles that project inwardly toward the longitudinal axis of the head, and approximately frusto-conical-shaped rollers mounted on said spindles and provided with longitudinally extending chisel teeth, said rollers having spirally arranged grooves which are so disposed that the rollers will not track when in service.

In testimony whereof I hereunto affix my signature in the presence of two witnesses, this twenty-fourth day of May 1910.

HOWARD ROBERT HUGHES.

Witnesses:
WELLS L. CHURCH,
GEORGE BAKEWELL.

---

Correction in Letters Patent No. 979,496.

It is hereby certified that in Letters Patent No. 979,496, granted December 27, 1910, for an improvement in "Roller Boring-Drills" the name of the patentee was erroneously written and printed "Howard Robert Hughes," whereas said name should have been written and printed *Howard Robard Hughes;* and that the said Letters Patent should be read with this correction therein that the same may conform to the record of the case in the Patent Office.

Signed and sealed this 17th day of January, A. D., 1911.

[SEAL.]

C. C. BILLINGS,

*Acting Commissioner of Patents.*

It is hereby certified that in Letters Patent No. 979,496, granted December 27, 1910, for an improvement in "Roller Boring-Drills" the name of the patentee was erroneously written and printed "Howard Robert Hughes," whereas said name should have been written and printed *Howard Robard Hughes;* and that the said Letters Patent should be read with this correction therein that the same may conform to the record of the case in the Patent Office.

Signed and sealed this 17th day of January, A. D., 1911.

[SEAL.]

C. C. BILLINGS,

*Acting Commissioner of Patents.*